United States Patent
Inoue et al.

(10) Patent No.: US 12,033,403 B2
(45) Date of Patent: Jul. 9, 2024

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Daichi Inoue, Wako (JP); Sho Tamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 340 days.

(21) Appl. No.: 17/676,871

(22) Filed: Feb. 22, 2022

(65) Prior Publication Data
US 2022/0309804 A1 Sep. 29, 2022

(30) Foreign Application Priority Data
Mar. 26, 2021 (JP) ................. 2021-053833

(51) Int. Cl.
*G06V 20/56* (2022.01)
*B60W 30/12* (2020.01)
(Continued)

(52) U.S. Cl.
CPC ........... *G06V 20/588* (2022.01); *B60W 30/12* (2013.01); *B60W 30/182* (2013.01);
(Continued)

(58) Field of Classification Search
CPC ... G06V 20/588; G06V 10/809; B60W 30/12; B60W 30/182; B60W 40/04;
(Continued)

(56) References Cited

U.S. PATENT DOCUMENTS

2017/0225681 A1* 8/2017 Motoyama ........ B60W 50/0098
2022/0171590 A1* 6/2022 Seitz ...................... B60K 35/10

FOREIGN PATENT DOCUMENTS

JP 2008-249639 10/2008
JP 2018-189900 11/2018
(Continued)

OTHER PUBLICATIONS

Japanese Notice of Allowance for Japanese Patent Application 2021-053833 mailed Nov. 1, 2022.

*Primary Examiner* — Chuong A Ngo
(74) *Attorney, Agent, or Firm* — Amin, Turocy & Watson, LLP

(57) ABSTRACT

According to an embodiment, a vehicle control device includes a first recognizer configured to recognize a first road marking for partitioning a traveling lane of a vehicle on the basis of an output of a detection device that has detected a surrounding situation of the vehicle, a second recognizer configured to recognize a second road marking for partitioning the traveling lane with a means different from the first recognizer, a comparator configured to compare the first road marking with the second road marking, and a determiner configured to perform any one of a plurality of misrecognition determination processes including a process of determining that there is misrecognition in the first recognizer and a process of determining that there is misrecognition in one or both of the first recognizer and the second recognizer when there is a difference between the first road marking and the second road marking.

11 Claims, 8 Drawing Sheets

(51) Int. Cl.
*B60W 30/182* (2020.01)
*B60W 40/04* (2006.01)
*B60W 40/072* (2012.01)
*B60W 50/14* (2020.01)

(52) U.S. Cl.
CPC .......... *B60W 40/04* (2013.01); *B60W 40/072* (2013.01); *B60W 50/14* (2013.01); *B60W 2050/143* (2013.01); *B60W 2050/146* (2013.01); *B60W 2420/403* (2013.01); *B60W 2552/30* (2020.02); *B60W 2552/53* (2020.02); *B60W 2554/4045* (2020.02)

(58) Field of Classification Search
CPC ............... B60W 40/072; B60W 50/14; B60W 2050/143; B60W 2050/146; B60W 2420/403; B60W 2552/30; B60W 2552/53; B60W 2554/4045; B60W 60/001; B60W 40/06
See application file for complete search history.

(56) References Cited

FOREIGN PATENT DOCUMENTS

| | | |
|---|---|---|
| JP | 2019-046363 | 3/2019 |
| JP | 2019-152896 | 9/2019 |
| JP | 2020-003463 | 1/2020 |
| JP | 6790187 | 11/2020 |

\* cited by examiner

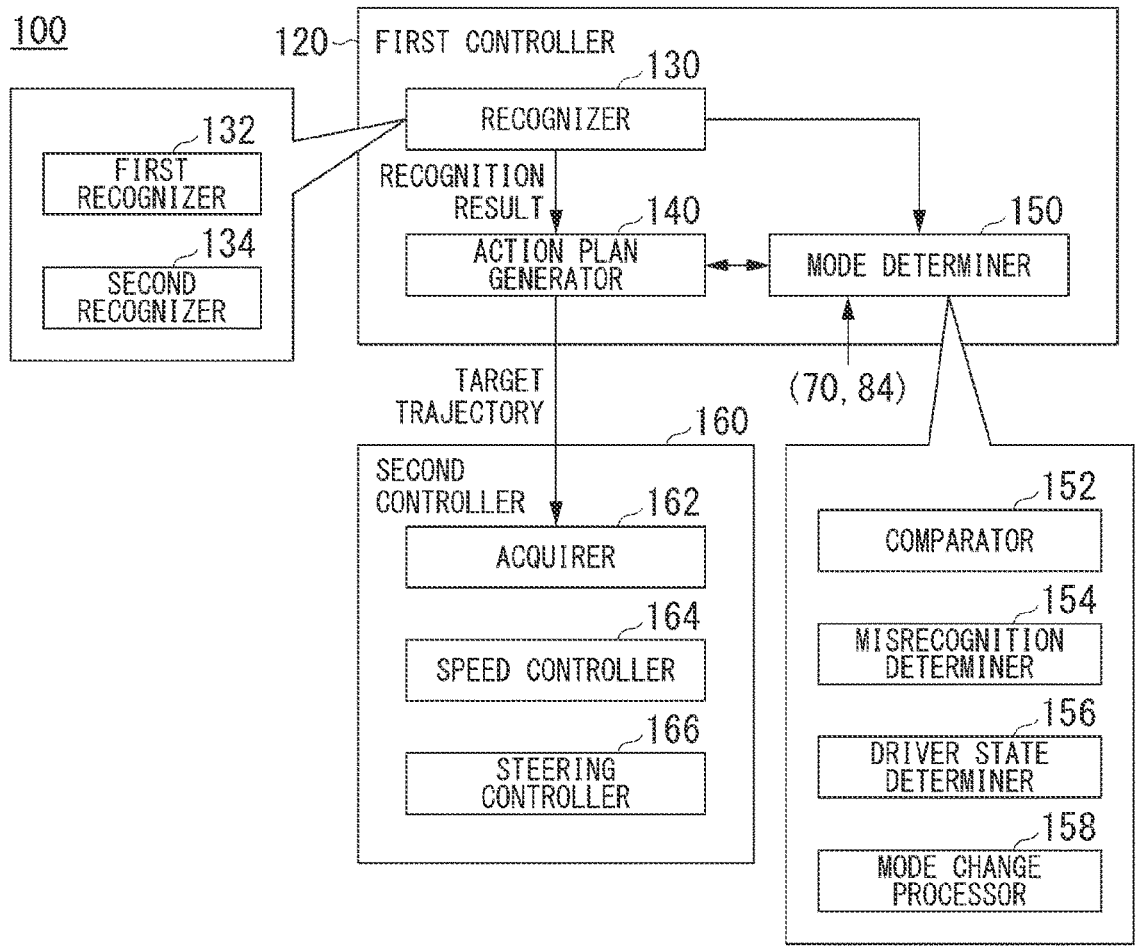

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2021-053833, filed Mar. 26, 2021, the content of which is incorporated herein by reference.

BACKGROUND

Field of the Invention

The present invention relates to a vehicle control device, a vehicle control method, and a storage medium.

Description of Related Art

In recent years, research on technologies for automatically controlling the traveling of a vehicle has been conducted. In this regard, the invention of a vehicle traveling assistance device for estimating a lane marker in a traveling direction of a host vehicle on the basis of previous lane marker information when a left-right difference between shapes of left and right lane markers on a road is detected, determining a lane situation of the road on the basis of a shape difference, and controlling the traveling of the host vehicle on the basis of the lane situation of the road has been disclosed (for example, Japanese Patent No. 6790187).

SUMMARY

Here, a control process of comparing a first road marking recognized from an image captured by an in-vehicle camera with a second road marking recognized from map information in automated driving, continuing the automated driving when the markings match, and ending the automated driving when the markings do not match may be performed. In this case, appropriate driving control may not be executed according to a recognition situation of the road markings.

Aspects of the present invention have been made in consideration of such circumstances and an objective of the present invention is to provide a vehicle control device, a vehicle control method, and a storage medium capable of executing more appropriate driving control in accordance with a recognition situation of road markings.

A vehicle control device, a vehicle control method, and a storage medium according to the present invention adopt the following configurations.

(1): According to an aspect of the present invention, there is provided a vehicle control device including: a first recognizer configured to recognize a road marking for partitioning a traveling lane of a vehicle on the basis of an output of a detection device that has detected a surrounding situation of the vehicle; a second recognizer configured to recognize a road marking for partitioning the traveling lane with a means different from the first recognizer; a comparator configured to compare a first road marking recognized by the first recognizer with a second road marking recognized by the second recognizer; and a determiner configured to perform any one of a plurality of misrecognition determination processes including a process of determining that there is misrecognition in the first recognizer and a process of determining that there is misrecognition in one or both of the first recognizer and the second recognizer when there is a difference between the first road marking and the second road marking in a comparison result of the comparator.

(2): In the above-described aspect (1), the vehicle control device further includes a driving controller configured to control at least one of acceleration, deceleration, and steering of the vehicle, wherein the driving controller executes any one of a plurality of driving modes in which tasks imposed on an occupant of the vehicle are different on the basis of a determination result of the determiner.

(3): In the above-described aspect (1), the vehicle control device further includes an output controller configured to provide a notification to an occupant of the vehicle by outputting information about a state of the vehicle or a warning to an output device on the basis of a determination result of the determiner.

(4): In the above-described aspect (2), the plurality of driving modes include a first driving mode and a second driving mode in which a task imposed on the occupant is severer than in the first driving mode, and the driving controller causes the first driving mode to continue on the basis of the second road marking when the first driving mode is being executed and the determiner determines that there is misrecognition in the first recognizer.

(5): In the above-described aspect (4), the driving controller changes a driving mode of the vehicle from the first driving mode to the second driving mode when the first driving mode is being executed and the determiner determines that there is misrecognition in one or both of the first recognizer and the second recognizer.

(6): In the above-described aspect (1), the determiner performs any one of the plurality of misrecognition determination processes on the basis of a curvature change quantity of the first road marking and a determination condition based on an angle formed by the first road marking and the second road marking.

(7): In the above-described aspect (6), the determiner changes the determination condition on the basis of the surrounding situation of the vehicle.

(8): In the above-described aspect (7), the determiner changes the determination condition so that misrecognition in the first recognizer is easily determined when there is a branch point, a merge point, or an entrance or exit of a tunnel in a traveling direction of the vehicle or when a preceding vehicle is making a lane change or is being driven in a zigzag.

(9): In the above-described aspect (7), the determiner changes the determination condition so that a process of determining that there is misrecognition in the first recognizer is limited when there is an entrance or exit of a curved road in a traveling direction of the vehicle.

(10): According to an aspect of the present invention, there is provided a vehicle control method including: recognizing, by a computer of a vehicle control device, a first road marking for partitioning a traveling lane of a vehicle on the basis of an output of a detection device that has detected a surrounding situation of the vehicle; recognizing, by the computer of the vehicle control device, a second road marking for partitioning the traveling lane with a means different from a means that has recognized the first road marking; comparing, by the computer of the vehicle control device, the recognized first road marking with the recognized second road marking; and performing, by the computer of the vehicle control device, any one of a plurality of misrecognition determination processes including a process of determining that the first road marking is a misrecognized marking and a process of determining that one or both of the first road marking and the second road marking are misrecognized markings when there is a difference between the first road marking and the second road marking in a comparison result.

(11): According to an aspect of the present invention, there is provided a computer-readable non-transitory storage medium storing a program for causing a computer of a vehicle control device to: recognize a first road marking for partitioning a traveling lane of a vehicle on the basis of an output of a detection device that has detected a surrounding situation of the vehicle; recognize a second road marking for partitioning the traveling lane with a means different from a means that has recognized the first road marking; compare the recognized first road marking with the recognized second road marking; and perform any one of a plurality of misrecognition determination processes including a process of determining that the first road marking is a misrecognized marking and a process of determining that one or both of the first road marking and the second road marking are misrecognized markings when there is a difference between the first road marking and the second road marking in a comparison result.

According to the above-described aspects (1) to (11), it is possible to execute more appropriate driving control in accordance with a recognition situation of road markings.

BRIEF DESCRIPTION OF THE DRAWINGS

FIG. 2 is a functional configuration diagram of a first controller and a second controller.

FIG. 3 is a diagram showing an example of corresponding relationships between a driving mode, a control state of a vehicle M, and a task.

DESCRIPTION OF EMBODIMENTS

Embodiments of a vehicle control device, a vehicle control method, and a storage medium of the present invention will be described below with reference to the drawings. Hereinafter, an embodiment in which the vehicle control device is applied to an automated driving vehicle will be described as an example. For example, automated driving is a process of executing driving control by automatically controlling one or both of the steering and speed of the vehicle. The driving control may include, for example, various types of driving control such as a lane keeping assistance system (LKAS), auto lane changing (ALC), an adaptive cruise control system (ACC), and a collision mitigation brake system (CMBS). The driving control may include driving assistance control such as an advanced driver assistance system (ADAS). Driving of the automated driving vehicle may be controlled according to manual driving of an occupant (a driver).

[Overall Configuration]

Figure 1:
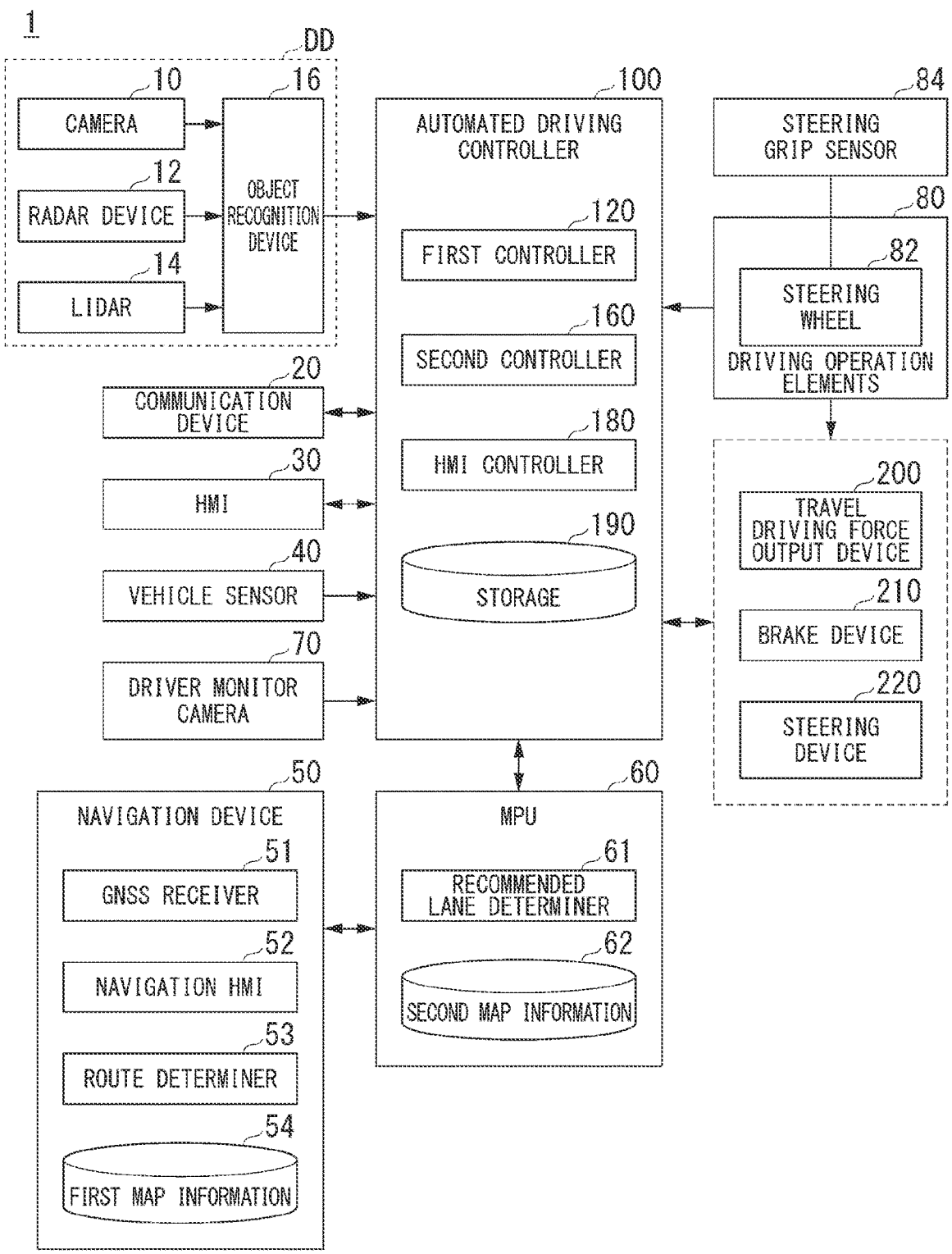
FIG. 1 is a configuration diagram of a vehicle system including a vehicle control device according to an embodiment.

FIG. 1 is a configuration diagram of a vehicle system 1 including the vehicle control device according to an embodiment. A vehicle (hereinafter referred to as a vehicle M) in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power when a battery (a power storage) such as a secondary battery or a fuel cell is discharged.

For example, the vehicle system 1 includes a camera 10, a radar device 12, a light detection and ranging sensor (LIDAR) 14, an object recognition device 16, a communication device 20, a human machine interface (HMI) 30, a vehicle sensor 40, a navigation device 50, a map positioning unit (MPU) 60, a driver monitor camera 70, driving operation elements 80, an automated driving controller 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added. The automated driving controller 100 is an example of a "vehicle control device." A combination of the camera 10, the radar device 12, the LIDAR 14, and the object recognition device 16 is an example of a "detection device DD." The HMI 30 is an example of an "output device."

For example, the camera 10 is a digital camera using a solid-state imaging element such as a charge-coupled device (CCD) or a complementary metal-oxide semiconductor (CMOS). The camera 10 is attached to any position on the vehicle in which the vehicle system 1 is mounted. When the view in front of the vehicle M is imaged, the camera 10 is attached to an upper part of a front windshield, a rear surface of a rearview mirror, a front part of a vehicle body, or the like. When the view to the rear is imaged, the camera 10 is attached to an upper part of a rear windshield, a back door, or the like. When the view to the side is imaged, the camera 10 is attached to a door mirror or the like. For example, the camera 10 periodically and iteratively images the surroundings of the vehicle M. The camera 10 may be a stereo camera.

The radar device 12 radiates radio waves such as millimeter waves around the vehicle M and detects at least a position (a distance to and a direction) of a physical object by detecting radio waves (reflected waves) reflected by the physical object. The radar device 12 is attached to any position on the vehicle M. The radar device 12 may detect a position and a speed of the physical object in a frequency modulated continuous wave (FM-CW) scheme.

The LIDAR 14 radiates light to the vicinity of the vehicle M and measures scattered light. The LIDAR 14 detects a distance to an object on the basis of time from light emission to light reception. The radiated light is, for example, pulsed laser light. The LIDAR 14 is attached to any location on the vehicle M.

The object recognition device 16 performs a sensor fusion process on detection results of some or all of the camera 10, the radar device 12, and the LIDAR 14 and recognizes positions, types, speeds, and the like of physical objects near the vehicle M. The physical objects include, for example, other vehicles (for example, nearby vehicles present within a prescribed distance from the vehicle M), pedestrians, bicycles, road structures, and the like. The road structures include, for example, road signs, traffic lights, railroad crossings, curbstones, medians, guardrails, fences, and the like. The road structures may include, for example, road markings (hereinafter referred to as markings) drawn or affixed to a road surface and road surface signs such as pedestrian crossings, bicycle crossing zones, and temporary stop lines. The object recognition device 16 outputs recognition results to the automated driving controller 100. The object recognition device 16 may output the detection results of the camera 10, the radar device 12, and the LIDAR 14 to the automated driving controller 100 as they are. In this case, the object recognition device 16 may be omitted from the configuration of the vehicle system 1 (specifically, the detection device DD). The object recognition device 16 may be included in the automated driving controller 100.

The communication device 20 uses a network, for example, such as a cellular network, a Wi-Fi network, a Bluetooth (registered trademark) network, a dedicated short range communication (DSRC) network, a local area network (LAN), a wide area network (WAN), or the Internet, to communicate with, for example, other vehicles near the vehicle M, a terminal device of a user using the vehicle M, or various types of server devices.

The HMI 30 outputs various types of information to the occupant of the vehicle M and receives an input operation by the occupant. For example, the HMI 30 includes various types of display devices, a speaker, a buzzer, a touch panel, a switch, keys, a microphone, the like.

The vehicle sensor 40 includes a vehicle speed sensor configured to detect the speed of the vehicle M, an acceleration sensor configured to detect acceleration, a yaw rate sensor configured to detect a yaw rate (for example, a rotational angular speed around a vertical axis passing through the center of gravity of the vehicle M), a direction sensor configured to detect a direction of the vehicle M, and the like. The vehicle sensor 40 may include a position sensor that detects the position of the vehicle M. The position sensor is, for example, a sensor that acquires position information (longitude/latitude information) from a Global Positioning System (GPS) device. The position sensor may be a sensor that acquires position information using a global navigation satellite system (GNSS) receiver 51 of the navigation device 50. A detection result of the vehicle sensor 40 is output to the automated driving controller 100.

For example, the navigation device 50 includes a global navigation satellite system (GNSS) receiver 51, a navigation HMI 52, and a route determiner 53. The navigation device 50 retains first map information 54 in a storage device such as a hard disk drive (HDD) or a flash memory. The GNSS receiver 51 identifies a position of the vehicle M on the basis of a signal received from a GNSS satellite. The position of the vehicle M may be identified or corrected by an inertial navigation system (INS) using an output of the vehicle sensor 40. The navigation HMI 52 includes a display device, a speaker, a touch panel, keys, and the like. The GNSS receiver 51 may be provided in the vehicle sensor 40. The navigation HMI 52 may be partly or wholly shared with the above-described HMI 30. For example, the route determiner 53 determines a route (hereinafter referred to as a route on a map) from the position of the vehicle M identified by the GNSS receiver 51 (or any input position) to a destination input by the occupant using the navigation HMI 52 with reference to the first map information 54. The first map information 54 is, for example, information in which a road shape is expressed by a link indicating a road of a predetermined section and nodes connected by the link. The first map information 54 may include point of interest (POI) information, and the like. The route on the map is output to the MPU 60. The navigation device 50 may perform route guidance using the navigation HMI 52 on the basis of the route on the map. The navigation device 50 may transmit a current position and a destination to a navigation server via the communication device 20 and acquire a route equivalent to the route on the map from the navigation server. The navigation device 50 outputs the determined route on the map to the MPU 60.

For example, the MPU 60 includes a recommended lane determiner 61 and retains second map information 62 in a storage device such as an HDD or a flash memory. The recommended lane determiner 61 divides the route on the map provided from the navigation device 50 into a plurality of blocks (for example, divides the route every 100 [m] in a traveling direction of the vehicle), and determines a recommended lane for each block with reference to the second map information 62. For example, the recommended lane determiner 61 determines in what lane numbered from the left the vehicle will travel. The lane is partitioned by markings. The recommended lane determiner 61 determines the recommended lane so that the vehicle M can travel along a reasonable route for traveling to a branching destination when there is a branch point in the route on the map.

The second map information 62 is map information that is more accurate than the first map information 54. The second map information 62 includes, for example, information about a road shape and a road structure and the like. The road shape includes, for example, a branch point, a merge point, a tunnel (an entrance or exit), a curved road (an entrance or exit), a radius of curvature (or curvature) or a curvature change quantity of a road or a marking, the number of lanes, a width, and a gradient as a road shape that is more detailed than that of the first map information 54. The above-described information may be stored in the first map information 54. Information about the road structure may include information such as a type and a position of the road structure and an orientation, a size, a shape, and a color of a road in an extending direction. In the type of road structure, for example, a marking may be set as one type or a lane mark belonging to the marking, a curbstone, a median, and the like may be different types. Types of markings may include, for example, a marking indicating that the lane change of the vehicle M is allowed and a marking indicating that the lane change is not allowed. For example, the type of marking may be set for each section of a road or a lane based on a link or a plurality of types may be set within one link.

The second map information 62 may include position information (latitude/longitude) of roads and buildings, address information (address/postal code), facility information, and the like. The second map information 62 may be updated at any time by the communication device 20 communicating with the external device. The first map information 54 and the second map information 62 may be provided integrally as map information. The map information (the first map information 54 and the second map information 62) may be stored in the storage 190.

The driver monitor camera 70 is, for example, a digital camera that uses a solid-state image sensor such as a CCD or a CMOS. For example, the driver monitor camera 70 is attached to any location on the vehicle M with respect to a position and a direction where the head of the driver sitting in the driver's seat of the vehicle M or another occupant sitting in a passenger seat or a rear seat can be imaged from the front (in a direction in which his/her face is imaged). For example, the driver monitor camera 70 is attached to an upper part of a display device provided on the central portion of the instrument panel of the vehicle M, an upper part of a front windshield, a rearview mirror, or the like. The driver monitor camera 70 periodically and iteratively captures an image including a cabin.

The driving operation elements 80 include, for example, an accelerator pedal, a brake pedal, a shift lever, and other operation elements in addition to the steering wheel 82. A sensor for detecting an amount of operation or the presence or absence of an operation is attached to the driving operation element 80 and a detection result thereof is output to the automated driving controller 100 or some or all of the travel driving force output device 200, the brake device 210, and the steering device 220. The steering wheel 82 is an example of an "operation element for receiving a steering operation by the driver." The operation element does not necessarily have to be annular and may be in the form of a variant steering wheel, a joystick, a button, or the like. A steering grip sensor 84 is attached to the steering wheel 82. The steering grip sensor 84 is implemented by a capacitance sensor or the like and outputs a signal for detecting whether or not the driver is gripping the steering wheel 82 (indicating that the driver is in contact with the steering wheel 82 in a state in which a force is applied) to the automated driving controller 100.

The automated driving controller 100 includes, for example, a first controller 120, a second controller 160, an HMI controller 180, and the storage 190. Each of the first controller 120, the second controller 160, and the HMI controller 180 is implemented, for example, by a hardware processor such as a central processing unit (CPU) executing a program (software). Some or all of these components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The above-described program may be pre-stored in a storage device (a storage device including a non-transitory storage medium) such as an HDD or a flash memory of the automated driving controller 100 or may be stored in a removable storage medium such as a DVD, a CD-ROM, or a memory card and installed in the storage device of the automated driving controller 100 when the storage medium (the non-transitory storage medium) is mounted in a drive device, a card slot, or the like. A combination of the action plan generator 140 and the second controller 160 is an example of a "driving controller." The HMI controller 180 is an example of an "output controller."

The storage 190 may be implemented by the various types of storage devices described above, an electrically erasable programmable read-only memory (EEPROM), a read-only memory (ROM), a random-access memory (RAM), or the like. For example, the storage 190 stores information required for executing various types of control in the embodiment, a program, and various other types of information. Map information (for example, the first map information 54 and the second map information 62) may be stored in the storage 190.

FIG. 2 is a functional configuration diagram of the first controller 120 and the second controller 160. The first controller 120 includes, for example, a recognizer 130 and an action plan generator 140. For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like, with which pattern matching is possible) in parallel and performing integrated evaluation by assigning scores to both recognitions. Thereby, the reliability of automated driving is ensured. For example, the first controller 120 executes control related to automated driving of the vehicle M on the basis of an instruction from the MPU 60, the HMI controller 180, or the like.

The recognizer 130 recognizes a surrounding situation of the vehicle M on the basis of recognition results of the detection device DD (information input from the camera 10, the radar device 12, and the LIDAR 14 via the object recognition device 16). For example, the recognizer 130 recognizes the vehicle M and states of types, positions, speeds, acceleration, and the like of physical objects present near the vehicle M. The type of physical object may be, for example, a type such as whether the physical object is a vehicle or a pedestrian or a type for identifying each vehicle. For example, the position of the physical object is recognized as a position on absolute coordinates using a representative point (a center of gravity, a driving shaft center, or the like) of the vehicle M as the origin and is used for control. The position of the physical object may be represented by a representative point such as a center of gravity, a corner, or an end of the traveling direction of the physical object or may be represented by a represented region. The speeds include, for example, speeds of the vehicle M and other vehicles with respect to a traveling direction (a vertical direction) of a traveling lane (hereinafter referred to as vertical speeds) and speeds of the vehicle M and other vehicles with respect to a horizontal direction of the lane (hereinafter referred to as horizontal speeds). For example, when the physical object is a moving object such as another vehicle, the "state" of a physical object may include acceleration or jerk of the physical object or an "action state" (for example, whether or not a lane change is being made or intended). The recognizer 130 includes, for example, a first recognizer 132 and a second recognizer 134. Details of functions of these components will be described below.

The action plan generator 140 generates an action plan for causing the vehicle M to travel according to driving control of automated driving or the like on the basis of a recognition result of the recognizer 130. For example, the action plan generator 140 generates a future target trajectory along which the vehicle M is allowed to automatically travel (independently of a driver's operation) so that the vehicle M can generally travel in the recommended lane determined by the recommended lane determiner 61 and further cope with a surrounding situation of the vehicle M on the basis of a recognition result of the recognizer 130, a surrounding road shape based on a current position of the vehicle M acquired from the map information, a recognition result of a marking, or the like. For example, the target trajectory includes a speed element. For example, the target trajectory is represented by sequentially arranging points (trajectory points) at which the vehicle M is required to arrive. The trajectory points are points at which the vehicle M is required to arrive for each prescribed traveling distance (for example, about several meters [m]) along a road. In addition, a target speed (and target acceleration) for each prescribed sampling time (for example, about several tenths of a second [sec]) is generated as a part of the target trajectory. The trajectory point may be a position at which the vehicle M is required to arrive at the sampling time for each prescribed sampling time. In this case, information about the target speed (and the target acceleration) is represented by an interval between the trajectory points.

The action plan generator 140 may set an automated driving event when the target trajectory is generated. For example, the events include a constant-speed traveling event for causing the vehicle M to travel in the same lane at a constant speed, a tracking traveling event for causing the vehicle M to track another vehicle (hereinafter referred to as a preceding vehicle) that is within a prescribed distance (for example, within 100 [m]) in front of the vehicle M and is closest to the vehicle M, a lane change event for causing the vehicle M to make a lane change from a host vehicle lane to an adjacent lane, a branch point-related movement event for causing the vehicle M to move to a lane in a destination direction at a branch point of a road, a merge point-related movement event for causing the vehicle M to move to a lane of a main road at a merge point, a takeover event for ending automated driving and performing switching to manual driving, and the like. The action plan generator 140 generates a target trajectory according to an activated event.

The mode determiner 150 determines the driving mode of the vehicle M to be one of a plurality of driving modes in which tasks imposed on the driver (an example of an occupant) are different. The mode determiner 150 includes, for example, a comparator 152, a misrecognition determiner 154, a driver state determiner 156, and a mode change processor 158. The misrecognition determiner 154 is an example of a "determiner." Details of functions of these components will be described below.

FIG. 3 is a diagram showing an example of corresponding relationships between the driving mode, the control state of the vehicle M, and the task. The driving modes of the vehicle M include, for example, five modes from mode A to mode E. A degree of automation of the control state, i.e., the driving control of the vehicle M, is highest in mode A among the above-described five modes, decreases in the order of mode B, mode C, and mode D, and is lowest in mode E. In contrast, the task imposed on the driver is mildest in mode A, becomes severer in the order of mode B, mode C, and mode D, and is severest in mode E. In modes D and E, the control state is not automated driving, so that the automated driving controller 100 is responsible for ending the control related to automated driving and performing the shift to driving assistance or manual driving. Hereinafter, an example of the content of each driving mode will be described.

In mode A, the state is an automated driving state and the driver is not required to monitor the surroundings of the vehicle M or grip the steering wheel 82 (steering grip in FIG. 3). Monitoring the surroundings includes at least monitoring in front of vehicle M. However, even in mode A, the driver is required to be in a posture in which the driving mode can be quickly shifted to manual driving in response to a request from the system centered on the automated driving controller 100. The term "automated driving" as mentioned herein indicates that all types including steering, acceleration, and deceleration are controlled without depending on the driver's operation. The front is a space in the traveling direction of the vehicle M which is visually recognized via the front windshield. Mode A is a driving mode that is executable when the vehicle M is traveling at a prescribed speed (for example, about 50 [km/h]) or less, for example, on a motorway such as an expressway, and a condition in which there is a preceding vehicle of a tracking target or the like is satisfied and may be called traffic jam pilot (TJP). When this condition is no longer satisfied, the mode determiner 150 changes the driving mode of the vehicle M to mode B.

In mode B, the state is a driving assistance state and a task of monitoring the front of the vehicle M (hereinafter referred to as forward monitoring) is imposed on the driver, but a task of gripping the steering wheel 82 is not imposed on the driver. In mode C, the state is a driving assistance state and the task of forward monitoring and the task of gripping the steering wheel 82 are imposed on the driver. Mode D is a driving mode that requires a certain degree of a driving operation by the driver with respect to at least one of steering, acceleration, and deceleration of the vehicle M. For example, in modes C and D, driving assistance such as ACC or LKAS is performed. ACC is a function of causing the vehicle M to track the preceding vehicle while keeping an inter-vehicle distance between the vehicle M and the preceding vehicle constant. LKAS is a function of assisting a process of keeping the lane of the vehicle M so that the vehicle M travels near the center of the traveling lane. In mode E, all types including steering, acceleration, and deceleration are in a state of manual driving that requires a driving operation by the driver and driving assistance such as ACC or LKAS is not performed. In both modes D and E, a task of monitoring the front of the vehicle M is naturally imposed on the driver. In the embodiment, for example, when mode A is a "first driving mode" and modes B to E are examples of a "second driving mode." When mode B is the "first driving mode," modes C to E are examples of the "second driving mode." That is, in the second driving mode, a task imposed on the driver is severer than that in the first driving mode.

The mode determiner 150 changes the driving mode of the vehicle M to a driving mode in which a task is severer when a task related to the determined driving mode is not executed by the driver. For example, in mode A, when the driver is in a posture in which he/she cannot shift the driving mode to manual driving in response to a request from the system (for example, when he/she continues to look outside of an allowable area or when a sign indicating that driving becomes difficult is detected), the mode determiner 150 performs a control process of prompting the driver to shift the driving mode to manual driving using the HMI 30 and causing the vehicle M to stop slowly near the shoulder of a road and stopping automated driving if the driver does not respond. After the automated driving is stopped, the host vehicle is in the state of mode D or E and the vehicle M can be started according to a manual operation of the driver. Hereinafter, the same is true for a "process of stopping automated driving." When the driver is not performing the forward monitoring in mode B, the mode determiner 150 performs a control process of prompting the driver to perform the forward monitoring using the HMI 30 and causing the vehicle M to stop slowly near the shoulder of a road and stopping automated driving if the driver does not respond. When the driver is not performing the forward monitoring or is not gripping the steering wheel 82 in mode C, the mode determiner 150 performs a control process of prompting the driver to perform the forward monitoring and/or to grip the steering wheel 82 using the HMI 30 and causing the vehicle M to stop slowly near the shoulder of a road and stopping automated driving if the driver does not respond.

The second controller 160 controls the travel driving force output device 200, the brake device 210, and the steering device 220 so that the vehicle M passes along the target trajectory generated by the action plan generator 140 at the scheduled times. The second controller 160 includes, for example, a target trajectory acquirer 162, a speed controller 164, and a steering controller 166. The target trajectory acquirer 162 acquires information of the target trajectory (trajectory points) generated by the action plan generator 140 and stores the information in a memory (not shown). The speed controller 164 controls the travel driving force output device 200 or the brake device 210 on the basis of a speed element associated with the target trajectory stored in the memory. The steering controller 166 controls the steering device 220 in accordance with a degree of bending of the target trajectory stored in the memory. The processes of the speed controller 164 and the steering controller 166 are implemented by, for example, a combination of feedforward control and feedback control. As an example, the steering controller 166 executes feedforward control according to the radius of curvature (or curvature) of the road in front of the vehicle M and feedback control based on the deviation from the target trajectory in combination.

The HMI controller 180 notifies the occupant of prescribed information using the HMI 30. For example, the prescribed information includes information related to traveling of the vehicle M such as information about the state of the vehicle M and information about driving control. The information about the state of the vehicle M includes, for example, a speed of the vehicle M, an engine speed, a shift position, and the like. The information about the driving control includes, for example, the presence or absence of execution of the driving control based on automated driving, information for asking about whether or not to start the automated driving, a situation of the driving control by the automated driving (for example, content of a driving mode or an event which is being executed), information of switching of the driving mode, and the like. The prescribed information may include information that is not related to the traveling control of the vehicle M, such as a television program or content (for example, a movie) stored in a storage medium such as a DVD. The prescribed information may include, for example, information about a current position and a destination of the vehicle M and the remaining amount of fuel.

For example, the HMI controller 180 may generate an image including the above-described prescribed information and cause the display device of the HMI 30 to display the generated image or may generate speech indicating the prescribed information and cause the generated speech to be output from a speaker of the HMI 30. The HMI controller 180 may output information received by the HMI 30 to the communication device 20, the navigation device 50, the first controller 120, and the like. The HMI controller 180 may transmit various types of information to be output to the HMI 30 to a terminal device used by the occupant of the vehicle M via the communication device 20. The terminal device is, for example, a smartphone or a tablet terminal.

The travel driving force output device 200 outputs a travel driving force (torque) for enabling the vehicle M to travel to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the second controller 160 or information input from the accelerator pedal of the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the driving operation element 80 so that brake torque according to a braking operation is output to each wheel. The brake device 210 may include a mechanism configured to transfer the hydraulic pressure generated according to an operation on the brake pedal to the cylinder via a master cylinder as a backup. The brake device 210 is not limited to the above-described configuration and may be an electronically controlled hydraulic brake device configured to control an actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second controller 160 or the information input from the steering wheel of the driving operation element 80 to change the direction of the steerable wheels.

[Recognizer and Mode Determiner]

Figure 4:
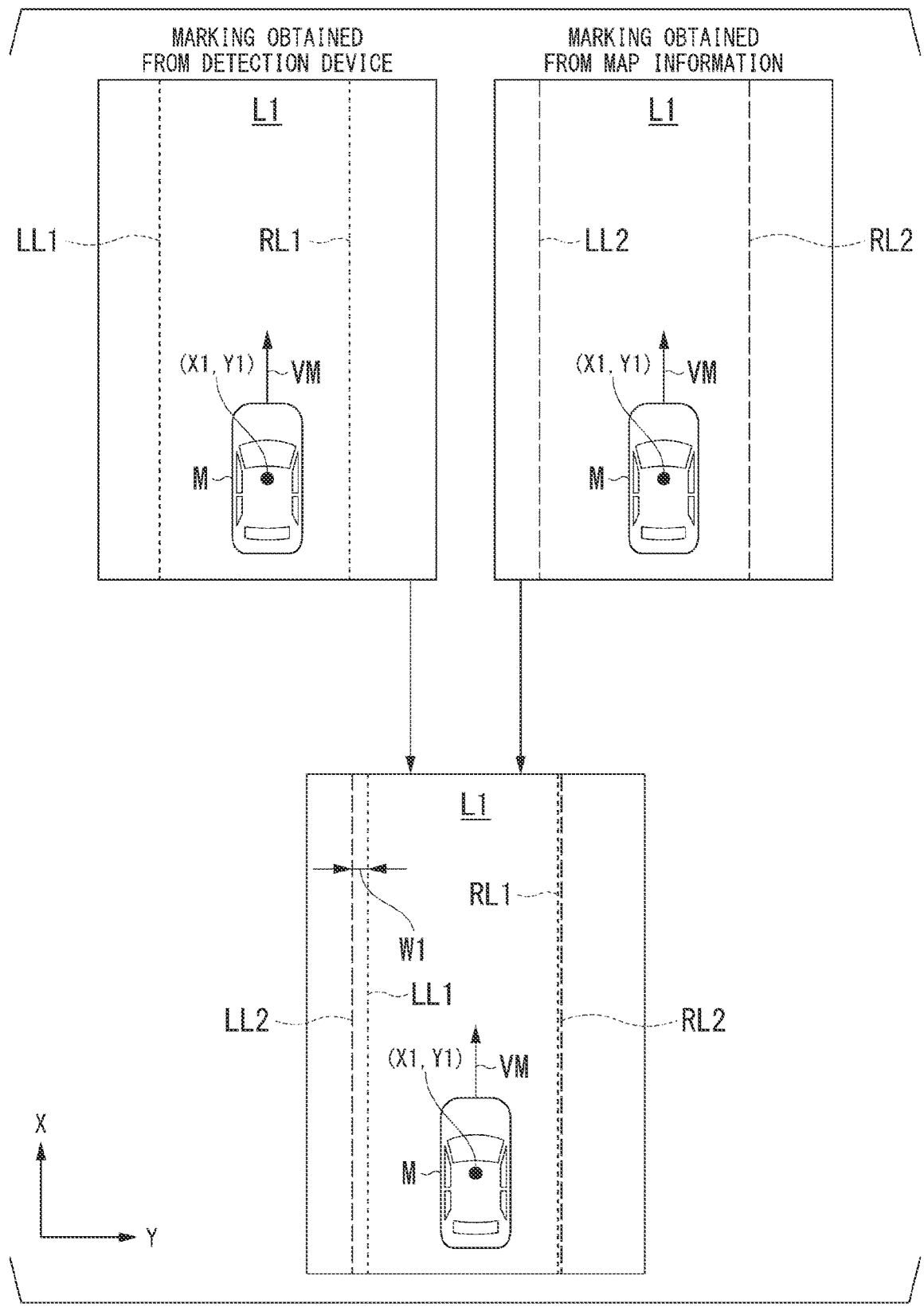
FIG. 4 is a diagram for describing content of processes of a first recognizer, a second recognizer, a comparator, and a misrecognition determiner.

Hereinafter, details of functions included in the recognizer 130 and the mode determiner 150 will be described. FIG. 4 is a diagram for describing content of processes of the first recognizer 132, the second recognizer 134, the comparator 152, and the misrecognition determiner 154. In the example of FIG. 4, a lane L1 in which traveling is possible in the same direction (an X-axis direction in FIG. 4) is shown. The lane L1 is partitioned by markings LL and RL. The lane L1 is assumed to be, for example, an expressway, a motorway, or a main road with priority on vehicles. The same is true for the subsequent lanes L2 and L3. In the example of FIG. 4, it is assumed that the vehicle M is traveling at a speed VM in the extending direction of the lane L1.

The first recognizer 132 recognizes left and right markings LL1 and RL1 that partition the traveling lane (the lane L1) of the vehicle M, for example, on the basis of an output of the detection device DD. The markings L11 and RL1 are examples of a "first road marking." For example, the first recognizer 132 analyzes an image captured by the camera 10, extracts edge points having large luminance differences from adjacent pixels in the image, and connects the edge points to recognize the markings LL1 and RL1 in an image plane. The first recognizer 132 converts positions of the markings LL1 and RL1 based on position information ((X1, Y1) in FIG. 4) of a representative point (for example, the center of gravity or the center) of the host vehicle M into a vehicle coordinate system (for example, XY plane coordinates in FIG. 4). The first recognizer 132 recognizes, for example, radiuses of curvatures or curvatures of the markings LL1 and RL1. The first recognizer 132 may recognize curvature change quantities of the markings LL1 and RL1. The curvature change quantity is, for example, a rate of change in curvature R over time at a forward distance X [m] when viewed from the vehicle M of the markings LL1 and RL1 recognized by the camera 10. The first recognizer 132 may recognize a radius of curvature, curvature, or a curvature change quantity of the road (the lane L1) by averaging radiuses of curvatures, curvatures, or curvature change quantities of the markings LL1 and RL1.

The second recognizer 134 recognizes markings LL2 and RL2 that partition the traveling lane L1 of the vehicle M, for example, with a means different from the first recognizer 132. The markings LL2 and RL2 are examples of a "second road marking." The "different means" includes, for example, at least one of cases where devices for recognizing the markings are different, methods are different, and information to be input is different. For example, the second recognizer 134 recognizes the markings LL2 and RL2 that partition the traveling lane L1 of the vehicle M from the map information on the basis of the position of the vehicle M. The above-described map information may be the second map information 62, map information newly downloaded from an external device, or information obtained by integrating the map information. For example, the second recognizer 134 acquires position information ((X1, Y1) in FIG. 4) of the vehicle M from the vehicle sensor 40 and the navigation device 50 and recognizes the markings LL2 and RL2 that partition the lane L1 present at the position of the vehicle M from the second map information 62 with reference to the second map information 62 on the basis of the acquired position information. The second recognizer 134 recognizes radiuses of curvatures, curvatures, or curvature change quantities of the markings LL2 and RL2 from the second map information 62. The second recognizer 134 may recognize a radius of curvature, curvature, or a curvature change quantity of the road (the lane L1) by averaging radiuses of curvatures, curvatures, or curvature change quantities of the road markings LL2 and RL2. Hereinafter, it is assumed that the markings LL1 and RL1 are markings recognized by the first recognizer 132 and the markings LL2 and RL2 are markings recognized by the second recognizer 134.

The comparator 152 compares a recognition result of the first recognizer 132 (a first road marking) with a recognition result of the second recognizer 134 (a second road marking). For example, the comparator 152 compares the position of the marking LL1 with the position of the marking LL2 on the basis of the position (X1, Y1) of the vehicle M. Likewise, the comparator 152 compares the position of the marking RL1 with the position of the marking RL2. The comparator 152 may compare curvature change quantities and marking extension directions in the markings LL1 and LL2 and the markings RL1 and RL2.

The misrecognition determiner 154 performs any one of a plurality of misrecognition determination processes including a process of determining that there is misrecognition in the first recognizer 132 and a process of determining that there is misrecognition in one or both of the first recognizer 132 and the second recognizer 134 when there is a difference between the recognition result of the first recognizer 132 (the first road marking) and the recognition result of the second recognizer 134 (the second road marking) in a comparison result of the comparator 152 and the like. The case where there is a difference is, for example, a case where a magnitude of the difference becomes greater than or equal to a prescribed value (threshold value). The magnitude of the difference is, for example, a degree of deviation to be described below. The plurality of misrecognition determination processes may include, for example, a process of determining that there is misrecognition in the second recognizer 134. The term "it is determined that there is misrecognition" described above may be paraphrased as the term "it is determined whether or not there is misrecognition." The term "it is determined that there is misrecognition in the first recognizer 132" may be rephrased as, for example, the term "the first road marking is determined to be a marking misrecognized by the first recognizer 132." Also, for example, the term "it is determined that there is misrecognition in one or both of the first recognizer 132 and the second recognizer 134" may be paraphrased as the term "one or both of the first road marking or the second road marking are determined to be misrecognized markings."

For example, the comparator 152 causes the marking LL1 and the marking LL2 to be superimposed on the plane (XY plane) of the vehicle coordinate system on the basis of the position (X1, Y1) of the representative point of the vehicle M. Likewise, the comparator 152 causes the marking RL1 and the marking RL2 to be superimposed on the basis of the position (X1, Y1) of the representative point of the vehicle M. The misrecognition determiner 154 determines whether or not the position of the marking LL1 and the position of the marking LL2 that have been superimposed match. Also, the misrecognition determiner 154 determines whether or not the positions of the markings RL1 and RL2 match in a similar way.

For example, when a determination process is performed using the markings LL1 and LL2, the misrecognition determiner 154 determines that the markings match if a degree of deviation between the markings is less than a threshold value and determines that the markings do not match (or that there is a difference) if the degree of deviation between the markings is greater than or equal to the threshold value. The deviation may be, for example, deviation at a horizontal position (in the Y-axis direction in FIG. 4) (for example, a deviation quantity W1 between the markings LL1 and LL2 in FIG. 4), a difference at a vertical position (a length of a distance in the X-axis direction), or a combination thereof. The deviation may be a curvature change quantity difference between the markings LL1 and LL2 or an angle formed by the markings LL1 and LL2 (hereinafter referred to as a separation angle).

For example, when it is determined that the compared markings match, the misrecognition determiner 154 determines that there is no misrecognition in the first recognizer 132 and the second recognizer 134 (in other words, the first road marking and the second road marking have been correctly recognized). When it is determined that the compared markings do not match (or that there is a difference), the misrecognition determiner 154 determines that there is misrecognition in one or both of the first recognizer 132 and the second recognizer 134. When it is determined that the compared markings do not match, the misrecognition determiner 154 derives a degree of deviation in a curvature change quantity or a separation angle and performs a more detailed misrecognition determination process using a derived value.

Figure 5:
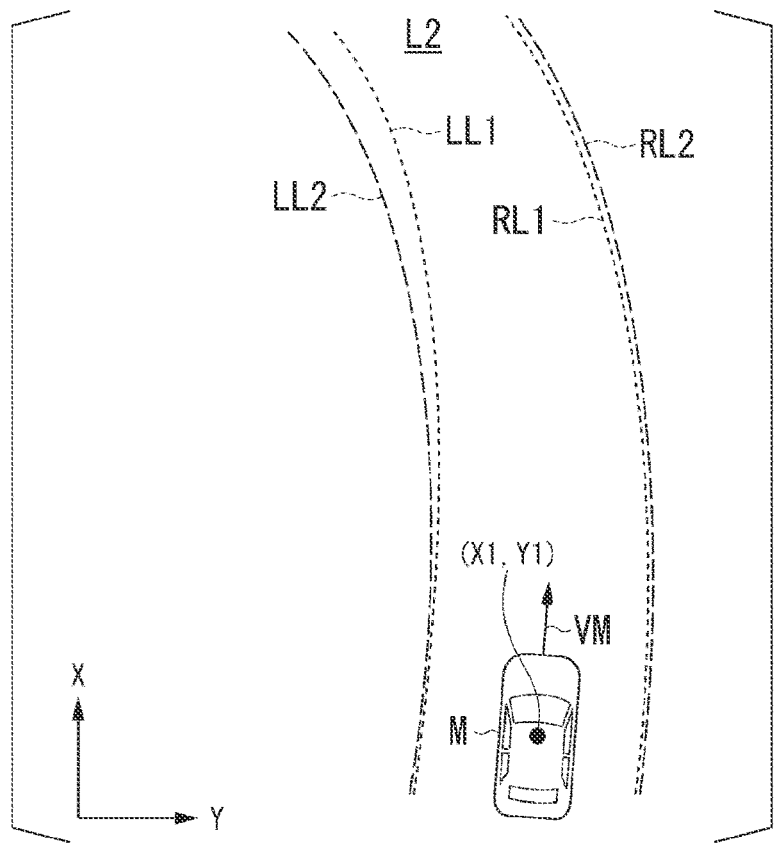
FIG. 5 is a diagram for describing a degree of deviation in a curvature change quantity.

FIG. 5 is a diagram for describing a degree of deviation in a curvature change quantity. In the example of FIG. 5, it is assumed that the vehicle M is traveling in the lane L2 that is a curved road at a speed VM. For example, the first recognizer 132 derives a curvature change quantity of the marking LL1 on the basis of a result of analyzing an image captured by the camera 10. For example, a position at the forward distance X [m] viewed from the vehicle M on the marking LL1 obtained from the image captured by the camera 10 is represented by a polynomial (Z(X)) of the following Eq. (1).

$$Z(X) = C_3 X^3 + C_2 X^2 + C_1 X + C_0 \qquad (1)$$

$C_0$ to $C_3$ denote prescribed coefficients. When the curvature change quantity of the marking LL1 is acquired, the first recognizer 132 first differentiates the polynomial of Eq. (1) twice with X and derives curvature R [rad/m] shown in Eq. (2).

$$R = \frac{d^2 Z}{d^2 X} = 6C_3 X + 2C_2 \quad (2)$$

Next, the first recognizer 132 differentiates Eq. (2) at time t and derives a change [rad/m/sec] in curvature R over time at the forward distance X [m] as a curvature change quantity as shown in Eq. (3).

$$\frac{dR}{dt} \cong \frac{(6C_3 X + 2C_2)_t - (6C_3 X + 2C_2)_{t-1}}{\Delta t} \quad (3)$$

The first recognizer 132 derives a curvature change rate of the marking LL1 by substituting X1 into X of the above-described Eqs. (1) to (3) when the position of the representative point (for example, the center of gravity) of the vehicle M is predetermined to be (X1, Y1) as shown in FIG. 5. The first recognizer 132 derives a curvature change rate of the marking RL1 in a similar method.

The second recognizer 134 recognizes curvature change rates of the markings LL2 and RL2 with reference to the map information (the second map information 62) on the basis of the position information of the vehicle M.

The misrecognition determiner 154 compares degrees of deviation between the curvature change rates of the markings LL1 and LL2. In this case, the misrecognition determiner 154 acquires how much the marking LL1 deviates from the marking LL2 as a reference. For example, the misrecognition determiner 154 derives an absolute value of a value obtained by subtracting the curvature change rate of the marking LL1 from the curvature change rate of the marking LL2 on the basis of the position (X1, Y1) of the vehicle M as a degree of deviation in the curvature change rate. The misrecognition determiner 154 derives the degree of deviation in the above-described curvature change rate using the curvature change rates of the markings RL1 and RL2. The comparator 152 may derive the above-described degree of deviation.

The misrecognition determiner 154 determines that there is misrecognition in the first recognizer 132 when one or both of a degree of deviation between the curvature change rates of the markings LL1 and LL2 and a degree of deviation between the curvature change rates of the markings RL1 and RL2 are greater than or equal to a prescribed value. The misrecognition determiner 154 may calculate an average value between the degree of deviation between the markings LL1 and LL2 and the degree of deviation between the markings RL1 and RL2 and determine that there is misrecognition in the first recognizer 132 when the calculated average value is greater than or equal to a prescribed value.

Figure 6:
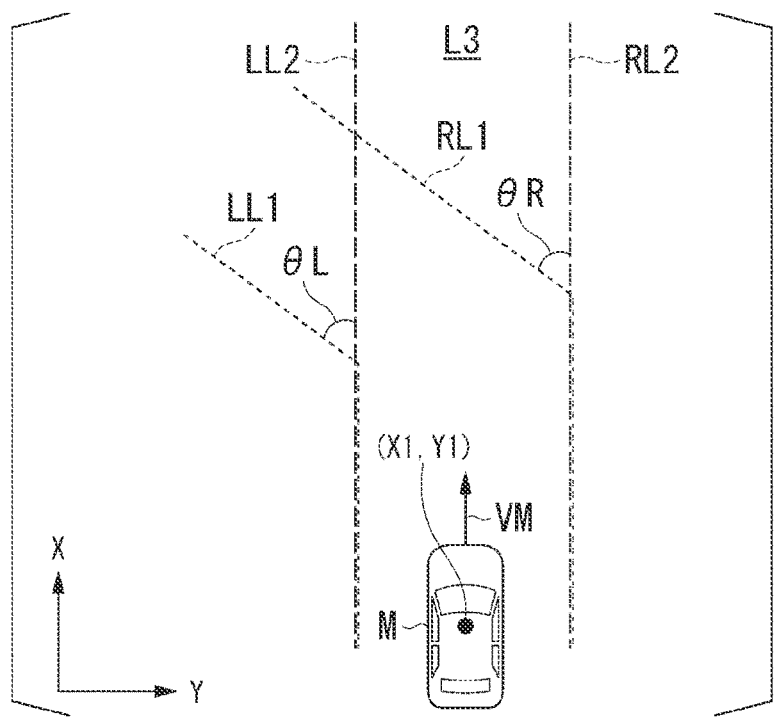
FIG. 6 is a diagram for describing a separation angle.

The misrecognition determiner 154 may determine at least whether or not there is misrecognition in the first recognizer 132 on the basis of a separation angle between the markings LL1 and LL2. FIG. 6 is a diagram for describing the separation angle. In the example of FIG. 6, it is assumed that the vehicle M is traveling in the lane L3 at a speed VM. The misrecognition determiner 154 derives an angle formed by the marking LL1 and the marking LL2 as a separation angle θL when the vehicle M is present at a prescribed position (X1, Y1). The misrecognition determiner 154 derives an angle formed by the marking RL1 and the marking RL2 as a separation angle θR. The separation angle θL is a deviation quantity of the marking LL1 with respect to the marking LL2 and the separation angle θR is a deviation quantity of the marking RL1 with respect to the marking RL2. The comparator 152 may derive the separation angles described above.

The misrecognition determiner 154 determines that there is misrecognition in the first recognizer 132 when one or both of the separation angles θL and θR are larger than or equal to a prescribed angle. The misrecognition determiner 154 may determine that there is misrecognition in the first recognizer 132 using only one of the separation angles θL and θR or determine misrecognition of a marking using an average angle between the separation angles θR and θL.

For example, a marking misrecognized from an image captured by the camera 10 often changes more than an actual marking due to a surrounding situation such as a road shape or a nearby vehicle. Therefore, when the degree of deviation between the curvature change rates or the separation angle is large, it is possible to perform a more appropriate misrecognition determination process by determining that there is misrecognition in the first recognizer 132.

Figure 7:
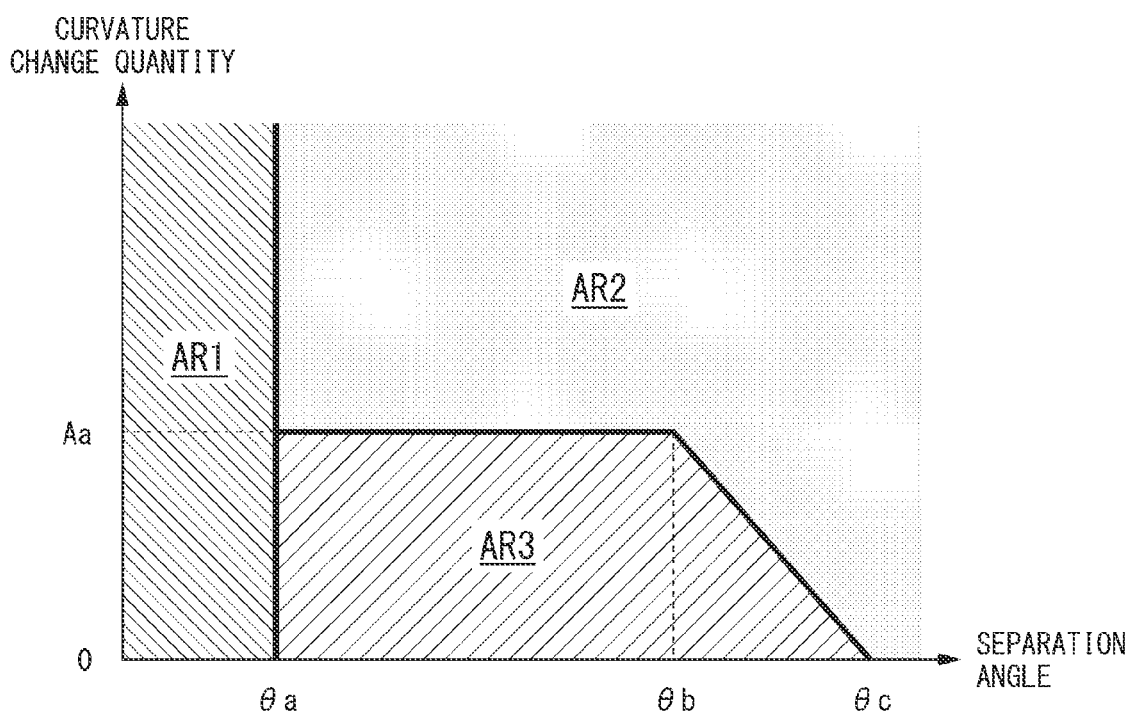
FIG. 7 is a diagram for describing a misrecognition determination process using the curvature change quantity and the separation angle.

The misrecognition determiner 154 may perform a misrecognition determination process using both the curvature change quantity and the separation angle. FIG. 7 is a diagram for describing a misrecognition determination process using the curvature change quantity and the separation angle. The vertical axis of FIG. 7 represents a curvature change quantity of the first road marking recognized by the first recognizer 132 and the horizontal axis thereof represents a separation angle associated with the first road marking. In the example of FIG. 7, three areas AR1 to AR3 are set in a relationship between the curvature change quantity and the separation angle. The area AR1 is an example of a "first area," the area AR2 is an example of a "second area," and the area AR3 is an example of a "third area."

For example, the area AR1 is an area where the separation angle is less than a prescribed angle θa and is an area where it is determined that neither the first recognizer 132 nor the second recognizer 134 misrecognizes the marking. The area AR2 is a camera misrecognition area where it is determined that there is misrecognition only in the first recognizer 132 on the basis of a first determination condition (a first misrecognition determination condition). The first determination condition is a condition in which the separation angle is greater than or equal to θa and the curvature change quantity is greater than or equal to Aa, for example, as shown in FIG. 7. Further, the first determination condition may include a condition in which the separation angle is above a set boundary so that the curvature change quantity decreases as the angle increases from θb or more to θc (a curvature change rate is a value greater than or equal to that of a boundary line), a condition in which the separation angle is greater than or equal to θc regardless of the curvature change quantity, or the like. The area AR3 is an area where it is not possible to determine which of the first recognizer 132 and the second recognizer 134 is associated with misrecognition, but it is determined that there is misrecognition in one or both of the first recognizer 132 and the second recognizer 134 on the basis of a second determination condition (a second misrecognition determination condition). The second determination condition is a condition in which the separation angle is in a range of θa to θb and the curvature change quantity is less than Aa, for example, as shown in FIG. 7. Further, the second determination condition may include a condition in which the separation angle is below a set boundary so that the curvature change quantity decreases as the angle increases from θb or more to θc (a curvature change rate is a value less than that of a boundary line) or the like. The first determination condition and the second determination condition are examples of a "determination condition."

For example, when values of the curvature change quantity and the separation angle are present within the area AR1, the misrecognition determiner 154 determines that there is no misrecognition in the first recognizer 132 and the second recognizer 134 (or that there is correct recognition therein). When the values of the curvature change quantity and the separation angle are present within the area AR2, the misrecognition determiner 154 determines that there is misrecognition in the first recognizer 132. When the values of the curvature change quantity and the separation angle are present within the area AR3, the misrecognition determiner 154 determines that there is misrecognition in one or both of the first recognizer 132 and the second recognizer 134. In this way, the misrecognition can be determined in more detail on the basis of the values of the curvature change rate and the separation angle.

The driver state determiner 156 monitors the driver's state for changing each mode described above and determines whether or not the driver's state is a state according to the task. For example, the driver state determiner 156 analyzes an image captured by the driver monitor camera 70 to perform a posture estimation process and determines whether or not the driver is in a posture in which he/she cannot shift the driving mode to manual driving in response to a request from the system. The driver state determiner 156 analyzes the image captured by the driver monitor camera 70 to perform a line-of-sight estimation process and determines whether or not the driver is monitoring the surroundings (the front or the like).

The mode change processor 158 performs various types of processes for changing the mode on the basis of, for example, a determination result of the misrecognition determiner 154 and a determination result of the driver state determiner 156. For example, the mode change processor 158 issues an instruction for generating a target trajectory for stopping on the shoulder of a road to the action plan generator 140, issues an operation instruction to a driving assistance device (not shown), or controls the HMI 30 for prompting the driver to take an action when the state is not a state suitable for a current mode on the basis of a state of the driver (a state of surrounding monitoring) determined by the driver state determiner 156.

The mode change processor 158 changes the mode on the basis of a determination result of the misrecognition determiner 154. For example, when the misrecognition determiner 154 determines that there is no misrecognition in both the first recognizer 132 and the second recognizer 134, the mode change processor 158 causes automated driving or driving assistance to be executed in the corresponding driving mode on the basis of a current determination result of the driver state determiner 156, a surrounding situation, or the like.

When the first driving mode (for example, mode A) is being executed and the misrecognition determiner 154 determines that there is misrecognition in the first recognizer 132 (when the values of the curvature change quantity and the separation angle are present within the area AR2 shown in FIG. 7), the mode change processor 158 causes mode A to continue using a marking recognized from the map information. In this way, even if the marking recognized from the image captured by the camera 10 and the marking recognized from the map information do not match, it is possible to limit excessive switching from the first driving mode to the second driving mode by continuing driving control on the basis of the marking recognized from the map information when it is determined that there is misrecognition only in the first recognizer 132.

The mode change processor 158 ends the continuation of the first driving mode when a state in which the misrecognition determiner 154 determines that there is misrecognition in the first recognizer 132 continues for a prescribed time period. Thereby, it is possible to perform safer driving control.

When the first driving mode is being executed and the misrecognition determiner 154 determines that one or both of the first recognizer 132 and the second recognizer 134 have misrecognized road markings (when the curvature change quantity and the separation angle are present at a position of the area AR3 shown in FIG. 7), the mode change processor 158 changes the mode from the first driving mode to the second driving mode (for example, mode B). Instead of changing the mode from mode A to mode B, the mode change processor 158 may change the mode to any one of modes C to E on the basis of a surrounding situation of the vehicle M and/or a determination result of the driver state determiner 156. When the mode is changed from mode A to mode E, the mode change processor 158 may switch the mode to modes B, C, and E step by step or may directly switch the mode from mode A to mode E.

The HMI controller 180 causes information about the state of the vehicle M or a prescribed warning to be output to the HMI 30 on the basis of control content associated with the first controller 120 and the second controller 160 and provides a notification to the occupant of the vehicle M. For example, the HMI controller 180 causes the HMI 30 to output a traveling state such as a driving mode of the vehicle M, a warning indicating that misrecognition has occurred, or the like on the basis of a determination result of the misrecognition determiner 154. The HMI controller 180 may cause the display device of the HMI 30 or the like to display information indicating that the first driving mode ends after the current state continues for a prescribed time period (or the driving mode is switched to the second driving mode after the elapse of a prescribed time period) when the first driving mode continues in a state in which the misrecognition determiner 154 determines that there is misrecognition in the first recognizer 132 or cause the information to be output from the HMI 30 by speech or the like (a pre-notification process). Thereby, it is possible to notify the occupant in advance that there is a possibility of switching from the first driving mode to the second driving mode and allow the occupant to prepare a task as soon as possible. When a notification device for providing a notification such as a warning is provided within the vehicle system 1, the HMI controller 180 may control the operation of the notification device instead of (or in addition to) causing the HMI 30 to output the notification. In this case, the notification device is an example of an "output device."

Modified Examples

Figure 8:
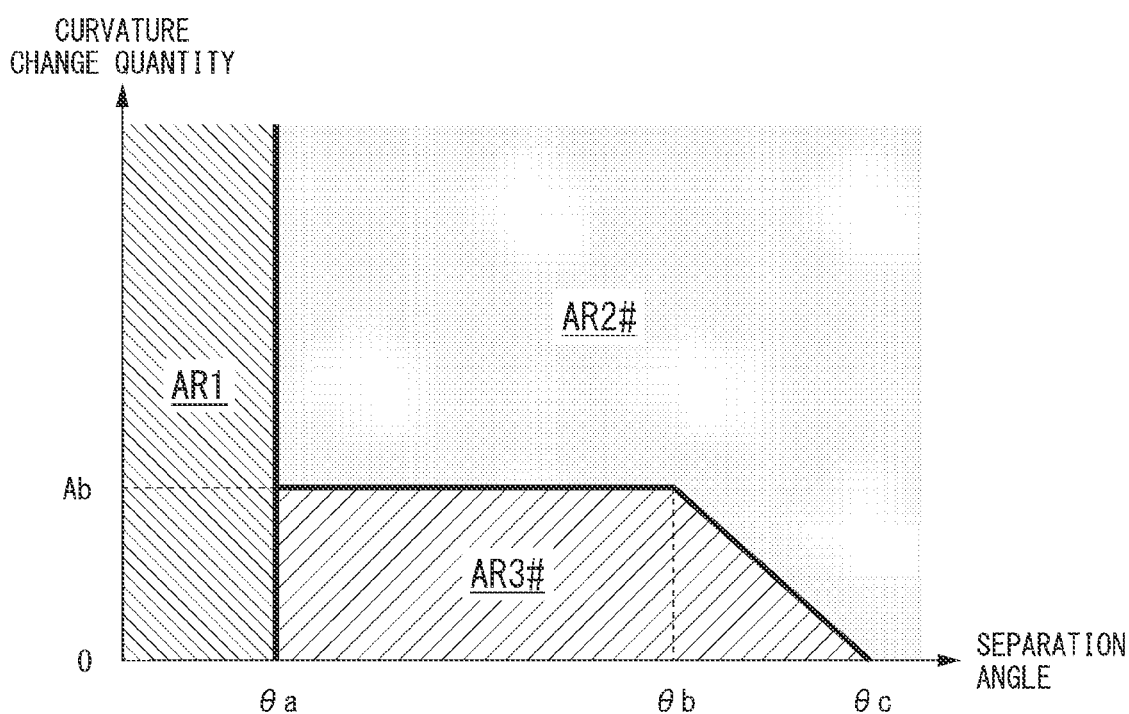
FIG. 8 is a diagram for describing that areas are changed in accordance with a surrounding situation of the vehicle M.

For example, the misrecognition determiner 154 may change at least one area among the above-described areas (reference areas) AR1 to AR3 shown in FIG. 7 (one or both of the first determination condition and the second determination condition) on the basis of the surrounding situation of the vehicle M. FIG. 8 is a diagram for describing that the areas AR1 to AR3 are changed in accordance with the surrounding situation of the vehicle M. For example, in a shape of a road on which the vehicle M travels, when there is a branch point or a merge point in the traveling direction (the forward direction) of the vehicle M, there is a high possibility that the first recognizer 132 will misrecognize the first road marking. Thus, for example, when there is a branch point, a merge point, or the like in the traveling direction of the vehicle M, the misrecognition determiner 154 changes the first determination condition and the second determination condition so that it is easily determined that there is misrecognition in the first recognizer 132. Specifically, the misrecognition determiner 154 makes an area (AR2#) large as compared with the reference areas AR1 to AR3 and changes the area AR3 to a reduced area (AR3#) as shown in FIG. 8 when there is a prescribed road shape such as a branch point or a merge point within a prescribed distance from a current position of the vehicle M in the traveling direction of the vehicle M on a road on which the vehicle M travels with reference to map information on the basis of the position information of the vehicle M. The misrecognition determiner 154 sets the area AR2# and the area AR3#, for example, by changing a parameter Aa of the curvature change quantity included in the first determination condition and the second determination condition to Ab smaller than Aa.

Thereby, the misrecognition determination process is performed using the areas AR1, AR2#, and AR3# shown in FIG. 8 in the vicinity of the branch point or the merge point, so that it is easily determined that there is misrecognition in the first recognizer 132. When it is determined that there is misrecognition in the first recognizer 132, the current driving control is continued on the basis of the marking recognized from the map information, so that more appropriate driving control can be executed.

When a route to a destination is preset in the navigation device 50 and a route in a destination direction is not a main lane but is a lane on a branch side, a task imposed on the driver is required to be severe as in manual driving or the like. Therefore, even if there is a branch point or the like in the traveling direction (the forward direction) of the vehicle M, the misrecognition determiner 154 may be configured not to change the above-mentioned areas AR2 and AR3 when the destination direction is the lane on the branch side.

For example, even if there is an entrance or exit of a tunnel in the traveling direction of the vehicle M, because there is a possibility that the first recognizer 132 will misrecognize the marking according to a change in luminance, the misrecognition determiner 154 may perform a change process of increasing the reference area AR2 and decreasing the area AR3 as described above. The misrecognition determiner 154 may change the above-described areas AR2 and AR3 because the marking is hidden by a preceding vehicle and there is a high possibility that there will be misrecognition in the first recognizer 132 even if the recognizer 130 recognizes that the preceding vehicle in front of the vehicle M makes a lane change or is being driven in a zigzag.

The misrecognition determiner 154 may make an increased amount of the area AR2 and/or a decreased amount of the area AR1 different according to the surrounding situation of the vehicle M. For example, the misrecognition determiner 154 makes the increased amount of the area AR2 (or the decreased amount of the area AR3) larger at the branch point than at the merge point and makes the increased amount of the area AR2 (or the decreased amount of the area AR3) larger at the tunnel entrance than that at the tunnel exit. By adjusting each area according to the surrounding situation in this way, a more appropriate misrecognition determination process can be performed.

When the surrounding situation (the traveling lane) of the vehicle M is close to an entrance or exit of a curved road, a curvature change quantity of the marking recognized from an image captured by the camera 10 becomes large. However, there is a possibility that the angle (the separation angle) formed by the first road marking and the second road marking will be increased by a time period (a short time period) according to the deviation due to an influence of the deviation or the like from a front marking recognized from the map information on the basis of the position information of the vehicle M. Thus, the misrecognition determiner 154 may change the first determination condition and the second determination condition so that a process of determining that there is misrecognition in the first recognizer 132 is limited when the entrance or exit of the curved road is present in the traveling direction of the vehicle M. Specifically, the misrecognition determiner 154 changes sizes of the areas AR1 to AR3 so that a process of determining that there is misrecognition in the first recognizer 132 is limited when there is an entrance or exit of a curved road within a prescribed distance from a current position of the vehicle M in the traveling direction of the vehicle M on a road on which the vehicle M travels with reference to map information on the basis of the position information of the vehicle M.

Figure 9:
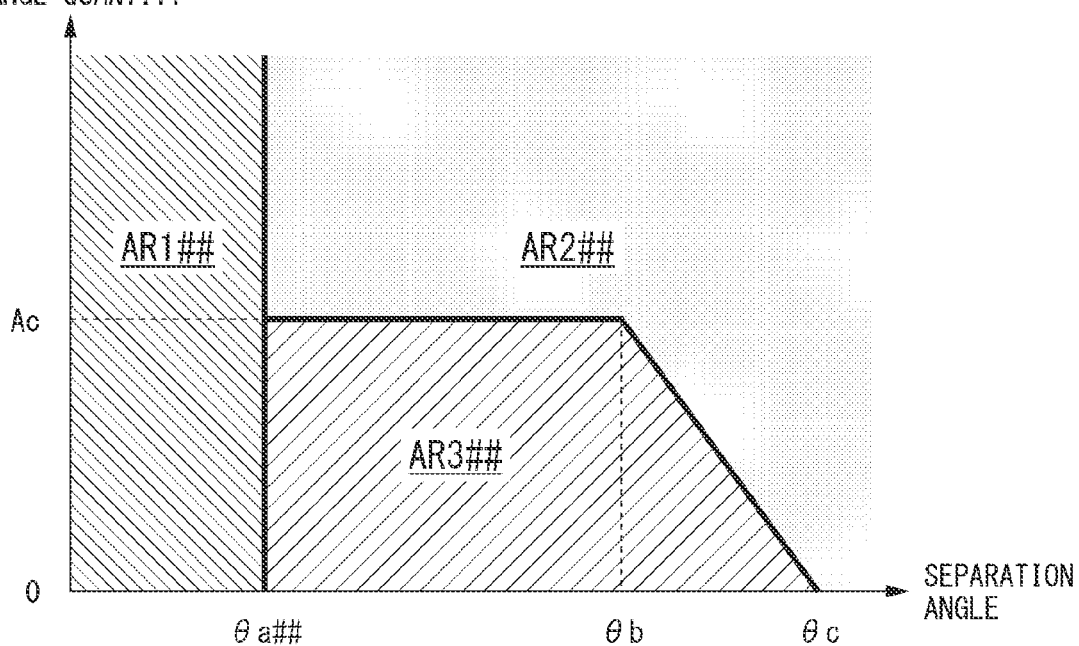
FIG. 9 is a diagram for describing that areas are changed so that a process of determining that there is misrecognition in a first recognizer is limited.

FIG. 9 is a diagram for describing that the areas AR1 to AR3 are changed so that a process of determining that there is misrecognition in the first recognizer 132 is limited. In the example of FIG. 9, the misrecognition determiner 154 sets an area AR1## obtained by increasing the area AR1 where it is determined that there is no misrecognition and sets areas AR2## and AR3## obtained by decreasing the areas AR2 and AR3 where it is determined that there is misrecognition. For example, the misrecognition determiner 154 sets the areas AR1## to AR3## by changing the parameter θa of the separation angle included in the first determination condition and the second determination condition to θa## (here, θa##<θb) larger than θa. In this way, it is possible to limit a process of determining that there is misrecognition in one or both of the first recognizer 132 and the second recognizer 134 by changing the area as shown in FIG. 9 and determining misrecognition when the entrance or exit of the curved road is present in the traveling direction of the vehicle M on the road on which the vehicle M travels.

Further, as shown in FIG. 9, the misrecognition determiner 154 may perform a process of changing the parameter Aa of the curvature change quantity to Ac larger than Aa and increasing the area AR3. Thereby, it is possible to further limit a process of determining that there is misrecognition in the first recognizer 132.

The misrecognition determiner 154 may change sizes of the reference areas AR1 to AR3 in accordance with weather (for example, heavy rain or snowstorm) around the vehicle M, a traveling time period (for example, a time period in which a marking included in a camera image is easily misrecognized due to an influence of the shadow formed on the road surface, the irradiation of sunlight, or the like), or the like.

[Processing Flow]

Figure 10:
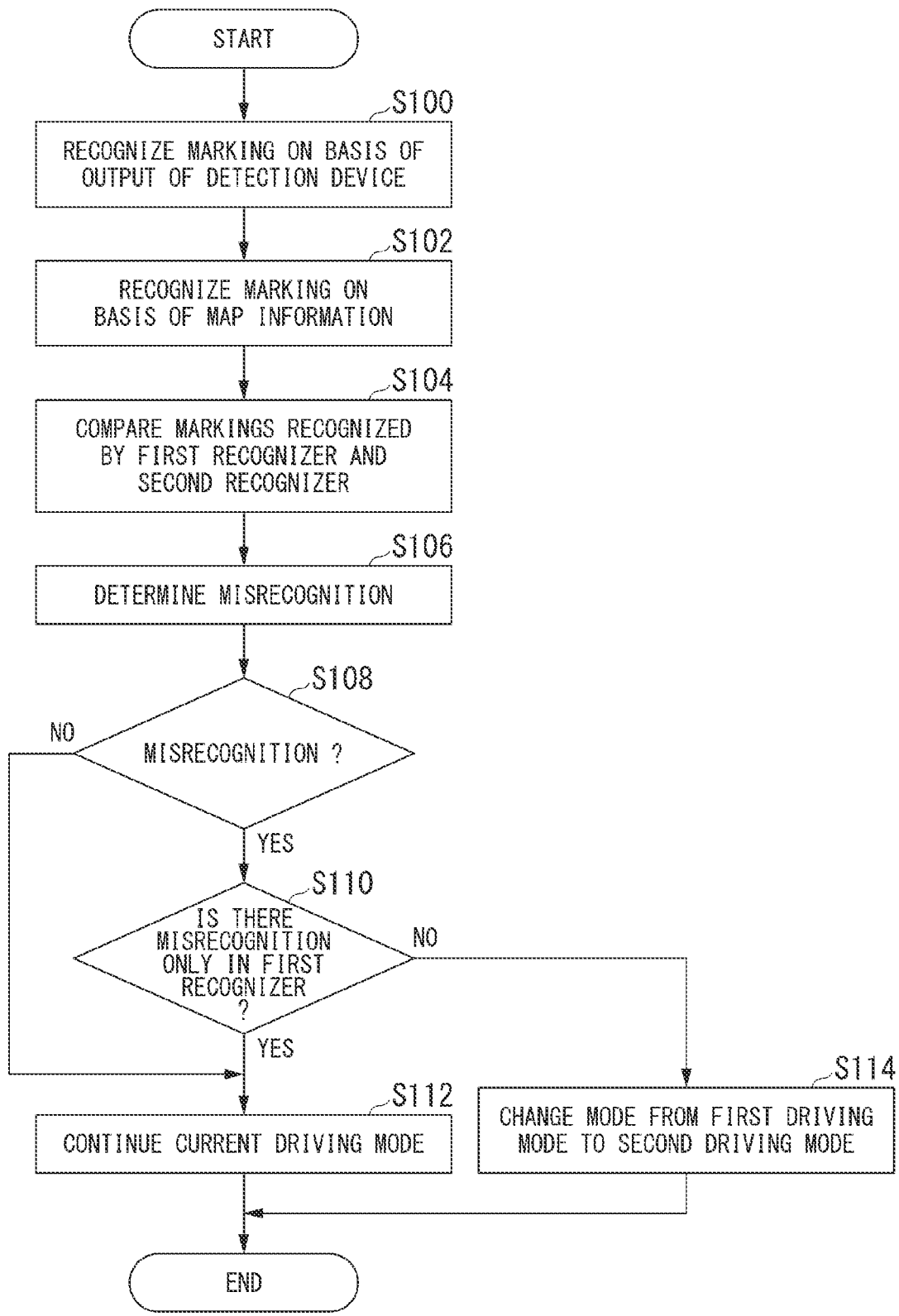
FIG. 10 is a flowchart showing an example of a flow of a process executed by an automated driving controller.

Next, a flow of a process executed by the automated driving controller 100 according to the embodiment will be described. FIG. 10 is a flowchart showing an example of the flow of the process executed by the automated driving controller 100. Hereinafter, a process of switching the driving control of the vehicle M on the basis of marking recognition results of the first recognizer 132 and the second recognizer 134 among processes to be executed by the automated driving controller 100 will be mainly described. At the start of the flowchart of FIG. 10, it is assumed that driving control in the first driving mode (for example, mode A) is being executed in the vehicle M. In the following process, in the determination result of the driver state determiner 156, the driver's state is a state suitable for the mode being executed or the mode after switching (i.e., a situation in which the switching of the mode does not occur on the basis of the determination result of the driver state determiner 156). The process shown in FIG. 10 may be iteratively executed at prescribed timings.

In the example of FIG. 10, the first recognizer 132 recognizes a marking for partitioning a lane in which the vehicle M travels on the basis of an output of the detection device DD (step S100). Subsequently, the second recognizer 134 recognizes a marking for portioning the lane in which the vehicle M travels with reference to map information on the basis of position information of the vehicle M obtained from the vehicle sensor 40 and/or the GNSS receiver 51 (step S102). The processing of steps S100 and S102 may be performed in the reverse order or may be performed in parallel. Subsequently, the comparator 152 compares a marking recognized by the first recognizer 132 with a marking recognized by the second recognizer 134 (step S104). Subsequently, the misrecognition determiner 154 performs a marking misrecognition determination process associated with the first recognizer 132 and the second recognizer 134 on the basis of a comparison result of the comparator 152 (step S106). Details of the processing of step S106 will be described below.

The misrecognition determiner 154 determines whether or not one or both of the first recognizer 132 and the second recognizer 134 have misrecognized road markings (step S108). When it is determined that there is misrecognition, the misrecognition determiner 154 determines whether or not there is misrecognition only in the first recognizer 132 (step S110). When it is determined that there is misrecognition only in the first recognizer 132, the mode change processor 158 causes the current driving mode to continue (step S112). Even if it is determined that neither the first recognizer 132 nor the second recognizer 134 has misrecognized the road marking in the processing of step S108, the processing of step S112 is performed.

When it is determined that misrecognition is not misrecognition only in the first recognizer 132 in the processing of step S108, the mode change processor 158 executes a control process of changing the driving mode of the vehicle M from the first driving mode to the second driving mode (step S114). The term "when it is determined that misrecognition is not misrecognition only in the first recognizer 132" indicates, for example, that it is not possible to determine which of the first recognizer 132 and the second recognizer 134 is associated with misrecognition, but it is determined that there is misrecognition in one or both of the first recognizer 132 and the second recognizer 134. Thereby, the process of the present flowchart ends.

Figure 11:
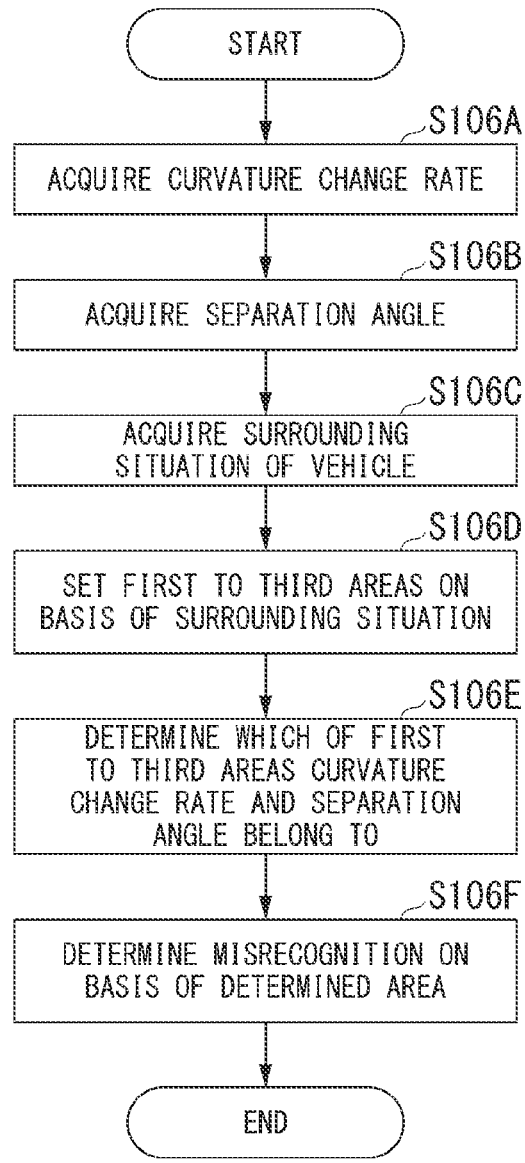
FIG. 11 is a flowchart showing an example of a flow of the processing of step S106.

FIG. 11 is a flowchart showing an example of a flow of the processing of step S106. In the example of FIG. 11, the misrecognition determiner 154 acquires a curvature change rate of a marking recognized by the first recognizer 132 (step S106A). Subsequently, the misrecognition determiner 154 acquires an angle (a separation angle) formed by a first road marking recognized by the first recognizer 132 and a second road marking recognized by the second recognizer 134 (step S106B).

Subsequently, the misrecognition determiner 154 acquires the surrounding situation of the vehicle M recognized by the recognizer 130 (step S106C) and sets first to third areas (areas AR1 to AR3) on the basis of the acquired surrounding situation (step S106D). Subsequently, the misrecognition determiner 154 determines which of the set first to third areas the curvature change rate and the separation angle belong to on the basis of the curvature change rate and the separation angle (step S106E). Subsequently, on the basis of the determined area, the misrecognition determiner 154 determines that there is misrecognition in the first recognizer 132 or performs a determination process in which it is not possible to determine which of the first recognizer 132 and the second recognizer 134 is associated with misrecognition, but it is determined that there is misrecognition in one or both of the first recognizer 132 and the second recognizer 134 (step S106F). Thereby, the process of the present flowchart ends.

According to the above-described embodiment, a vehicle control device includes the first recognizer 132 configured to recognize a road marking for partitioning a traveling lane of the vehicle M on the basis of an output of the detection device DD that has detected a surrounding situation of the vehicle M; the second recognizer 134 configured to recognize a road marking for partitioning the traveling lane with a means different from the first recognizer; a comparator configured to compare a first road marking recognized by the first recognizer 132 with a second road marking recognized by the second recognizer 134; and the misrecognition determiner 154 (an example of a determiner) configured to perform any one of a plurality of misrecognition determination processes including a process of determining that there is misrecognition in the first recognizer and a process of determining that there is misrecognition in one or both of the first recognizer and the second recognizer when there is a difference between the first road marking and the second road marking in a comparison result of the comparator, so that more appropriate operation control can be executed according to the recognition situation of the road marking.

Specifically, according to the embodiment, it is possible to continue a driving mode in which a degree of automation of driving control is high using map information when a first road marking is clearly incorrect even if it is determined that there is misrecognition by performing a misrecognition determination process on the basis of a first determination condition in which it is determined that the first road marking is incorrect and a second determination condition in which one or both of the first road marking and the second road marking are incorrect, but it is not possible to determine which of the first road marking and the second road marking is incorrect when the first road marking and the second road marking do not match. Also, according to the embodiment, even if it is determined that there is misrecognition, the deterioration of a level of an unnecessary driving mode can be limited because it is possible to continue a driving mode in which a degree of automation of driving control is high according to map information (a task imposed on the occupant is milder).

The embodiment described above can be represented as follows.

A vehicle control device including:
a storage device storing a program; and
a hardware processor,
wherein the hardware processor executes the program stored in the storage device to:

recognize a first road marking for partitioning a traveling lane of a vehicle on the basis of an output of a detection device that has detected a surrounding situation of the vehicle;

recognize a second road marking for partitioning the traveling lane with a means different from a means that has recognized the first road marking;

compare the recognized first road marking with the recognized second road marking; and perform any one of a plurality of misrecognition determination processes including a process of determining that the first road marking is a misrecognized marking and a process of determining that one or both of the first road marking and the second road marking are misrecognized markings when there is a difference between the first road marking and the second road marking in a comparison result.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
   a first recognizer configured to recognize a road marking for partitioning a traveling lane of a vehicle on the basis of an output of a detection device that has detected a surrounding situation of the vehicle;
   a second recognizer configured to recognize a road marking for partitioning the traveling lane with a means different from the first recognizer;
   a comparator configured to compare a first road marking recognized by the first recognizer with a second road marking recognized by the second recognizer; and
   a determiner configured to perform any one of a plurality of misrecognition determination processes including a process of determining that there is misrecognition in the first recognizer and a process of determining that there is misrecognition in one or both of the first recognizer and the second recognizer when there is a difference between the first road marking and the second road marking in a comparison result of the comparator.

2. The vehicle control device according to claim 1, further comprising a driving controller configured to control at least one of acceleration, deceleration, and steering of the vehicle,
   wherein the driving controller executes any one of a plurality of driving modes in which tasks imposed on an occupant of the vehicle are different on the basis of a determination result of the determiner.

3. The vehicle control device according to claim 2,
   wherein the plurality of driving modes include a first driving mode and a second driving mode in which a task imposed on the occupant is severer than in the first driving mode, and
   wherein the driving controller causes the first driving mode to continue on the basis of the second road marking when the first driving mode is being executed and the determiner determines that there is misrecognition in the first recognizer.

4. The vehicle control device according to claim 3, wherein the driving controller changes a driving mode of the vehicle from the first driving mode to the second driving mode when the first driving mode is being executed and the determiner determines that there is misrecognition in one or both of the first recognizer and the second recognizer.

5. The vehicle control device according to claim 1, further comprising an output controller configured to provide a notification to an occupant of the vehicle by outputting information about a state of the vehicle or a warning to an output device on the basis of a determination result of the determiner.

6. The vehicle control device according to claim 1, wherein the determiner performs any one of the plurality of misrecognition determination processes on the basis of a curvature change quantity of the first road marking and a determination condition based on an angle formed by the first road marking and the second road marking.

7. The vehicle control device according to claim 6, wherein the determiner changes the determination condition on the basis of the surrounding situation of the vehicle.

8. The vehicle control device according to claim 7, wherein the determiner changes the determination condition so that misrecognition in the first recognizer is easily determined when there is a branch point, a merge point, or an entrance or exit of a tunnel in a traveling direction of the vehicle or when a preceding vehicle is making a lane change or is being driven in a zigzag.

9. The vehicle control device according to claim 7, wherein the determiner changes the determination condition so that a process of determining that there is misrecognition in the first recognizer is limited when there is an entrance or exit of a curved road in a traveling direction of the vehicle.

10. A vehicle control method comprising:
    recognizing, by a computer of a vehicle control device, a first road marking for partitioning a traveling lane of a vehicle on the basis of an output of a detection device that has detected a surrounding situation of the vehicle;
    recognizing, by the computer of the vehicle control device, a second road marking for partitioning the traveling lane with a means different from a means that has recognized the first road marking;
    comparing, by the computer of the vehicle control device, the recognized first road marking with the recognized second road marking; and
    performing, by the computer of the vehicle control device, any one of a plurality of misrecognition determination processes including a process of determining that the first road marking is a misrecognized marking and a process of determining that one or both of the first road marking and the second road marking are misrecognized markings when there is a difference between the first road marking and the second road marking in a comparison result.

11. A computer-readable non-transitory storage medium storing a program for causing a computer of a vehicle control device to:
    recognize a first road marking for partitioning a traveling lane of a vehicle on the basis of an output of a detection device that has detected a surrounding situation of the vehicle;
    recognize a second road marking for partitioning the traveling lane with a means different from a means that has recognized the first road marking;
    compare the recognized first road marking with the recognized second road marking; and
    perform any one of a plurality of misrecognition determination processes including a process of determining that the first road marking is a misrecognized marking and a process of determining that one or both of the first road marking and the second road marking are misrecognized markings when there is a difference between the first road marking and the second road marking in a comparison result.

* * * * *